Aug. 30, 1966     J. SUMNER     3,269,032
TEXTILE DESIGN KIT AND METHOD OF MAKING TEXTILES THEREFROM
Filed June 10, 1964
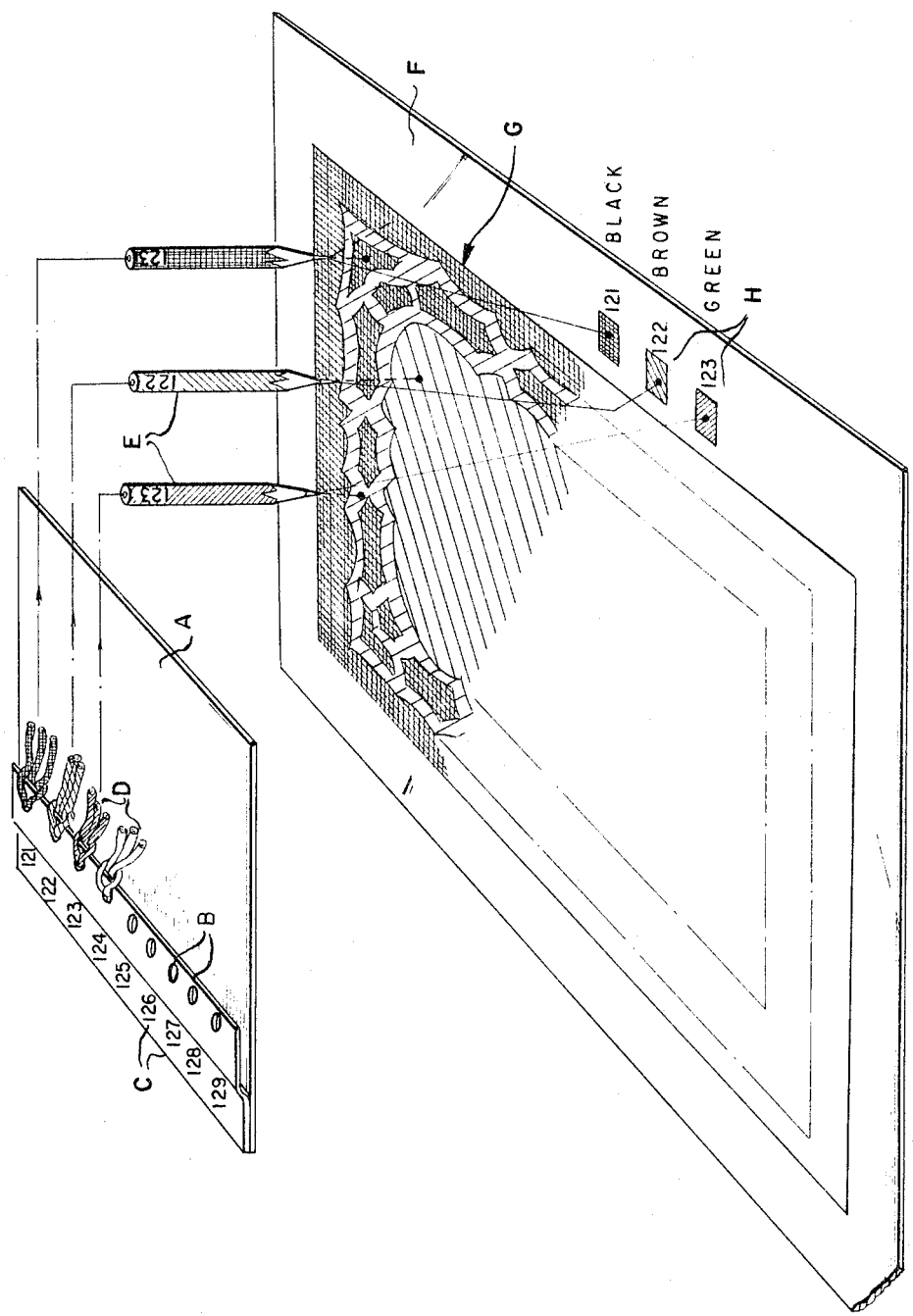
INVENTOR
JASON SUMNER
BY
Robertson, Smythe & Bryan
ATTORNEYS

United States Patent Office 3,269,032
Patented August 30, 1966

3,269,032
TEXTILE DESIGN KIT AND METHOD OF MAKING TEXTILES THEREFROM
Jason Sumner, 7 William St., Riverside, Conn.
Filed June 10, 1964, Ser. No. 375,974
3 Claims. (Cl. 35—15)

This is a continuation-in-part of a co-pending application, Serial Number 364,498, filed May 4, 1964, now abandoned.

This invention relates in general to the manufacture of a patterned textile and more particularly, it relates to the means to make a customized small scale colored patterned simulation of a desired patterned textile prior to manufacturing the full scale textile and as a part of the process for manufacturing such full scale textile.

There is a substantial demand in the textile field for customized textiles, that is, textiles which are designed and manufactured specifically for a certain space decor. It has always been difficult to satisfy such demand and to date, there has been no satisfactory way of allowing the space decorator to select the colors and pattern, view the aesthetic effect of the selection and have assurance that the manufactured product will have the desired colors.

Any proposed design and manufacturing method for customizing textiles must be practical and economical for a proposed customer to design the customized textile so that he is assured the colors he intends will be the same as those which will be present in the full scale product and if possible to provide the means to allow actual comparison of the colors and pattern with the proposed space decor.

The present invention provides a pattern textile design kit that provides the means to make a customized small scale colored patterned simulation of a distinct patterned textile prior to manufacturing the full scale textile and where such colored patterned simulation is available to directly compare with the remaining decor of the space to receive the full scale textile. In the invention, there are a predetermined group of color samples for use in a predetermined collection of patterns, with a plurality of color samples placed on a color board at spaced positions with each position having a corresponding identifying indicia. Thus, the color sample is affixed to the color board at positions where each sample has a color selected from the predetermined group. The kit also provides a plurality of coloring devices that produce colors corresponding to those in the predetermined group of sample colors so as to obtain a match. At least one small scale separate and identified pattern simulation card is provided in which there is a small scale outline of at least a portion of a textile pattern. In the spaces of the card, there are provisions for inserting at least two selected sample colors by the use of the coloring devices to produce a colored simulation of a textile pattern having selected colors corresponding to the yarn samples.

The invention further provides that there be a plurality of pattern simulation cards from which one may make a selection.

An additional feature of the invention is that spaces are provided on the pattern simulation cards for insertion thereon of the indicia from the color board that corresponds to the one of the selected sample color in the various spaces of the card.

Moreover, the invention provides a method of making a customized patterned textile to blend with a predetermined space decor wherein a colored simulation card made from the above kit is used as the instruction to the textile maker so that he will fabricate the textile in the colors according to the identifying indicia on the card and according to the pattern shown thereon.

In the situation where a customer as an interior decorator, for example, wishes a particular color scheme to be used in a selected space so as to provide a coordinated decor, it may be desired to have a specific custom made patterned textile, such as draperies, upholstery covering and carpet, which the decorator knows at the outset to be that which is desired and where there is a positive assurance that the textile, when delivered, will have the desired pattern and color. To this end, the present invention provides a textile design kit which is generally illustrated in the accompanying drawing. The principal component of the kit is a color board A in which there is a plurality of spaced positions thereon which is illustrated as a number of openings B opposite which and corresponding to, there are printed indicia C shown here as numbers. A card of this type may have many fixed positions for holding color samples, such as yarn in which such yarn may be grouped according to their pertinent colors, thus, one may see all of the various shades of red in a certain position of the card.

Affixed to the card and as shown through the openings thereon are a plurality of color samples D, here shown as pieces of colored yarn, each one of which is of a color from a predetermined group of colors that are available at the manufacturing mill. Thus, the yarn sample represents to the decorator a true color of the supply of yarn that the manufacturer will use, if so directed, in the ultimate manufacture of the full scale textile. The printed indicia C is an identifying device used by the manufacturer for that particular color.

As part of the kit, there is provided a plurality of coloring devices E which, if desired, may have numbers corresponding to the sample color identifying numbers, but which in any event, are capable of producing all of the colors that are shown by the sample colors on the color board.

As part of the kit, one may provide a plurality of separate and identified textile pattern simulation cards F that may be edgebound and which correspond to the predetermined collection of patterns that the manufacturing facility is capable of producing in full scale. Each of these cards is identified as to its style by printed indicia and includes at least a small scale outline G of a portion of a pattern of the collection of patterns available to the manufacturer. In some cases where the kit may be used for the design of a carpet, the cards may have a small scale reproduction of the entire carpet pattern on one face thereof and a slightly larger scale portion of such pattern on the reverse side. The purpose being that the pattern may be examined by the decorator or user in different scales so as to aid in the exercise of the design judgment. As can be seen in the accompanying drawing, the design of the exemplified carpet is accomplished by the selection of a particular simulation card representing the pattern desired and the use of at least two, and if desired, more different yarn colors. Accordingly, the decorator merely selects the sample colored yarn having the colors desired for the space decor and uses the coloring device or devices corresponding to the indicia for that yarn color to simulate the color in the spaces of the pattern shown on the simulation card in those portions of the pattern in which that color is desired. On the edge of the card as shown there are spaces H where the identifying indicia corresponding to that color of sample may be inserted.

Where it is desired to design flat textiles or those using fine yarn, the color samples may be swatches of colored goods, clusters of yarn or thread, or even color patches, as may be best adapted to properly provide a true color sample.

The dotted lined portions in the accompanying drawing are used to illustrate the direct connection between the color of sample on the color board, the color produced by the coloring device, the color entered on the simulation card, and the identifying indicia entered on the card. Having selected the sample colors and colored the card carefully, the designer-decorator is then in a position to view the simulated textile in total where all of the colors are seen simultaneously with the decor of the space to be decorated. Simultaneously, by use of the color board, he has a direct and specific comparison of the color samples to the colors in the projected decor. Accordingly, when the colored simulated card is in the hands of the manufacturer, the decorator may confidently know that the textile to be produced in full scale will have the precise colors that were ordered and that they are known to be compatible with the projected decor.

The manufacturer having the completed pattern card, when making a carpet, for example, then selects the carpet backing fabric for the full scale carpet and following the instructions of the simulation card printed indicia, selects a quantity of the colored yarn corresponding to the indicia. He then inserts that yarn in the known manner into the carpet backing into spaces indicated by the pattern and the coloring of the simulation card as completed by the designer-decorator. The carpet is then completed step by step in which yarn corresponding to the printed indicia is inserted in the place ordered by the card.

Should the patterned textile to be designed and manufactured be a fabric, then the pattern and colors may be done in accordance with the instruction of the pattern card and indicia by either weaving or printing as the case may be.

Accordingly, using the invention of the present kit, the designer is then able to make an exact design of a custom textile with assurance that the ultimate textile will have the same colors as ordered and that such colors do in fact correspond with the decisions of the designer in relationship to the decor of which the textile forms a part. On the other hand, the manufacturer is able to pursue with confidence in the manufacture of the textile based on the explicit and precise instructions of the designer-decorator so that the product produced is the one which is initially desired.

The kit is normally contained in a conventional carrying case and may additionally contain samples of various textile construction.

What is claimed is:

1. A patterned textile design kit to provide the means to make a customized small scale colored patterned simulation of a desired textile prior to manufacturing the full scale textile and where such colored patterned simulation is available to directly compare with the remaining decor of the space to receive the full scale textile, the colors coming from a predetermined group of true textile colors and a predetermined pattern that is available for manufacturing said full scale textile, said kit comprising a color board having a plurality of spaced positions therein with a corresponding indicia for each position, said indicia correspondng to each of the colors in said predetermined group, true color textile samples affixed to said color board at said positions with each sample having a color from said predetermined group, a plurality of coloring devices producing colors corresponding to those in said predetermined group and matching said true color textile samples, a separate and identified textile pattern simulation card and corresponding to said predetermined textile pattern, said card having a small scale outline of at least a portion of said pattern in the spaces of which at least two selected textile colors are placed by use of said coloring devices to produce a color simulation of said textile pattern and true color textile samples.

2. A patterned textile kit according to claim 1 in which said pattern simulation card has a plurality of identifying indicia spaces located on said card separate from said textile pattern wherein identifying indicia may be placed corresponding to any color in said predetermined group of true textile colors that is used to produce the color simulation on said card.

3. A method of making a customized patterned textile to blend with a predetermined space decor comprising providing a predetermined group of true color textile samples on a color board having a plurality of spaced positions therein with an identifying indicia for each position corresponding to true textile colored yarn at a factory, the true color textile samples being affixed to said color board at said positions with each sample having a color from said predetermined group, providing at least one small scale identified textile pattern simulation card with a plurality of coloring devices to produce colors corresponding to the true colors in said predetermined group and matching said true color textile samples, coloring at least a portion of the textile pattern on said simulation card by the use of said devices to correspond with a predetermined one of said true color textile samples, coloring at least another portion of the pattern on said simulation card with a second predetermined color by using said devices to correspond to a second of said predetermined true color textile samples to thus provide a color simulation of the full scale textile, entering the identifying indicia corresponding to each of said predetermined true color textile samples on said simulation card, sending said simulation card to said factory and fabricating said patterned textile in full scale to conform to the pattern and true coloring correponding to said colored simulation card.

References Cited by the Examiner

UNITED STATES PATENTS

| | | | |
|---|---|---|---|
| 1,538,718 | 5/1925 | Mehlem | 283—1 |
| 1,602,356 | 10/1926 | Franz | 35—27 |
| 1,957,816 | 5/1934 | Braeg | 35—26 |
| 2,059,123 | 10/1936 | Lawson et al. | 66—1 |
| 2,078,646 | 4/1937 | Treinis | 35—15 |
| 2,511,947 | 6/1950 | Samuels | 35—15 |
| 2,744,349 | 5/1956 | Grossman | 35—26 |
| 2,798,328 | 7/1957 | Fasino | 35—26 |
| 2,825,150 | 3/1958 | Steiner | 25—26 |

FOREIGN PATENTS

| | | |
|---|---|---|
| 1,119,698 | 4/1956 | France. |
| 461,973 | 2/1937 | Great Britain. |

EUGENE R. CAPOZIO, *Primary Examiner.*

DONALD W. PARKER, *Examiner.*

HENRY S. JAUDON, HARLAND S. SKOGQUIST,
*Assistant Examiners.*